United States Patent
Hirasawa

(10) Patent No.: US 7,622,879 B2
(45) Date of Patent: Nov. 24, 2009

(54) THERMAL PROTECTION APPARATUS AND METHOD FOR HYBRID VEHICLES

(75) Inventor: Takahiko Hirasawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 346 days.

(21) Appl. No.: 11/883,409

(22) PCT Filed: Feb. 14, 2006

(86) PCT No.: PCT/IB2006/000292

§ 371 (c)(1),
(2), (4) Date: Jul. 31, 2007

(87) PCT Pub. No.: WO2006/087618

PCT Pub. Date: Aug. 24, 2006

(65) Prior Publication Data

US 2008/0144237 A1    Jun. 19, 2008

(30) Foreign Application Priority Data

Feb. 15, 2005   (JP)   ............... 2005-037537

(51) Int. Cl.
*H02P 27/06* (2006.01)
*B60L 11/18* (2006.01)
*H02H 5/04* (2006.01)

(52) U.S. Cl. ............... 318/471; 318/139; 318/799; 361/24; 361/25; 361/103; 180/65.285

(58) Field of Classification Search ............... 318/139, 318/471, 799; 361/24, 25, 103; 180/65.285

See application file for complete search history.

(56) References Cited

U.S. PATENT DOCUMENTS

| 5,936,820 | A | 8/1999 | Umemura et al. |
| 6,268,986 | B1 | 7/2001 | Kobayashi et al. |
| 7,353,094 | B2* | 4/2008 | Okoshi et al. ............... 701/22 |
| 2007/0290650 | A1* | 12/2007 | Muta ............... 318/799 |
| 2008/0143281 | A1* | 6/2008 | Yaguchi ............... 318/139 |
| 2009/0120699 | A1* | 5/2009 | Suzuki et al. ........... 180/65.265 |
| 2009/0120701 | A1* | 5/2009 | Taguchi et al. ......... 180/65.285 |

FOREIGN PATENT DOCUMENTS

| JP | A 09-282020 | 10/1997 |
| JP | A 10-210790 | 8/1998 |
| JP | A 2004-325110 | 11/2004 |
| JP | A 2005-86919 | 3/2005 |

* cited by examiner

*Primary Examiner*—Paul Ip
(74) *Attorney, Agent, or Firm*—Oliff & Berridge, PLC

(57) ABSTRACT

Thermal variable-operation regulator that regulates the operation of an operating device by progressively limiting the operation of the operating device (24) as a limitation temperature (Tset) increases. The limitation temperature (Tset), based on which the operation of the operating device (24) is limited, is set to a smoothed temperature (Ttmp), obtained by performing a predetermined smoothing process on the detected temperature (Tiny), by a limitation temperature setting means when a change amount (ΔT) of the detected temperature (Tiny) is equal to or less than a predetermined change amount (Tref). However, when the change amount (ΔT) of the detected temperature (Tiny) is greater than the predetermined change amount (Tref), the limitation temperature (Tset) is set without using the detected temperature (Tiny). An operating means of the thermal variable operation regulator effects the operation and progressive limitation of the operating device (24) in response to increases in the limitation temperature (Tset).

10 Claims, 4 Drawing Sheets

THERMAL PROTECTION APPARATUS AND METHOD FOR HYBRID VEHICLES

INCORPORATION BY REFERENCE

The disclosure of Japanese Patent Application No. 2005-037537 filed on Feb. 15, 2005, including the specification, drawings and abstract is incorporated herein by reference in its entirety.

BACKGROUND OF THE INVENTION

1. Field of the Invention

The invention relates generally to a thermal variable-operation regulator and a method for controlling an operating device, and, more specifically, to a thermal variable-operation regulator including an operating device that heats up while operating and a method for controlling such operating device.

2. Description of the Related Art

Thermal variable-operation regulators of the above-mentioned type have been proposed. There are known thermal variable-operation regulators that reduce the maximum operation speed of the motor when the motor load factor exceeds a predetermined threshold value. The thermal variable-operation regulators calculate a motor load factor based on the ratio between a load determination value, which is obtained by integrating the square value of the motor current value proportional to an increase in the temperature of a motor serving as an operating device, and an overload determination value corresponding to the rated load. Such a thermal variable-operation regulator is described, for example, in Japanese Patent Application Publication No. JP-A-09-282020.

The described thermal variable-operation regulator, however, has the following problem. Because the integral value of the square value of the motor current value does not always accurately reflect the temperature of the motor (hereinafter, referred to as the "motor temperature"), the output from the motor is sometimes unnecessarily reduced. In order to address such a problem, the output from the motor may be limited based directly on the motor temperature. However, if the motor temperature rapidly changes, the degree to which the output from the motor is regulated rapidly increases, and, therefore, the output from the motor rapidly changes. As a result, a torque shock occurs, for example, when the motor is used as the drive unit for a vehicle. Alternatively, the output from the motor may be limited using a limitation temperature (that is the temperature based on which the output from the motor is limited), which is obtained by smoothing the motor temperature by using a high time constant so that changes in the motor temperature are more gradual. In this case, even if the detected motor temperature is below the temperature at which the motor would be shut off when the limitation temperature exceeds a shutoff threshold temperature at which the limit value becomes 100%, it takes a long time for the limitation temperature to become lower than the shutoff threshold temperature, because the limitation temperature is obtained by smoothing the motor temperature. As a result, restart of the output from the motor is delayed.

SUMMARY OF THE INVENTION

In light of the above-mentioned circumstances, the invention provides a thermal variable-operation regulator that more appropriately limits the operation of an operating device using the temperature of the operating device, and a method for controlling such operating device.

A first aspect of the invention relates to a thermal variable-operation regulator provided with an operating device that heats up while operating, such as an electric motor, an electric power generator, a drive circuit that drives the electric motor or the electric power generator, and a voltage converter that converts a voltage of electric power. The thermal variable-operation regulator includes a temperature detector that detects the temperature of the operating device; a controller that sets the limitation temperature, based on which the operation of the operating device is limited, wherein the limitation temperature is set to a smoothed temperature that is obtained by performing a predetermined smoothing process on the detected temperature, when the amount of change in the detected temperature is equal to or less than the predetermined change amount, and the limitation temperature is set without using the detected temperature, when the amount of change in the detected temperature is greater than the predetermined change amount, and wherein the predetermined smoothing process is a process where the smoothed temperature is obtained by adding a value, obtained by dividing a difference between the detected temperature and the already set limitation temperature by a predetermined number "n", to the already set limitation temperature to bring the smoothed temperature closer to the detected temperature, and that operates the operating device, and progressively limits the operation of the operating device as the limitation temperature increases.

With the thermal variable-operation regulator according to the first aspect of the invention, when the amount of change in the temperature of the operating device is equal to or less than the predetermined change amount, the limitation temperature is set to the smoothed temperature obtained by performing the predetermined smoothing process on the temperature of the operating device. Also, the operation of the operating device is progressively limited as the limitation temperature increases. On the other hand, when the amount of change in the temperature of the operating device is greater than the predetermined change amount, the limitation temperature is set without using the temperature of the operating device. Also, the operation of the operating device is progressively limited as the limitation temperature increases. Namely, if the amount of change in the temperature of the operating device is greater than the predetermined change amount, it is determined that there is an abnormality in the detection of the temperature, and the limitation temperature is set without using the abnormally detected temperature. It is, therefore, possible to suppress unnecessary limitation of the operation of the operating device based on the abnormally detected temperature. Examples of the operating device are an electric motor, an electric power generator, a drive circuit that drives the electric motor or the electric power generator, and a voltage converter that converts a voltage of electric power.

In the first aspect, the controller may set the limitation temperature to the smoothed temperature that is obtained by performing the predetermined smoothing process on the temperature detected when the last smoothed temperature was obtained, when the amount of change in the detected temperature is greater than the predetermined change amount. Thus, the limitation temperature is set using the temperature detected when the last smoothed temperature was obtained instead of using the abnormally detected temperature. It is, therefore, possible to more appropriately suppress the unnecessary limitation of the operation of the operating device based on the abnormally detected temperature.

In the first aspect, the controller may set the limitation temperature to the smoothed temperature that is obtained by performing the predetermined smoothing process on the detected temperature, when the smoothed temperature is equal to or lower than the predetermined temperature; and set the limitation temperature to the predetermined temperature, when the smoothed temperature that is obtained by performing the smoothing process on the detected temperature is higher than the predetermined temperature. When the temperature of the operating device decreases, the smoothed temperature promptly becomes equal to or lower than the predetermined temperature. Accordingly, it is possible to promptly decrease the degree to which the operation of the operating device is limited based on the limitation temperature set to the smoothed temperature. In this case, the predetermined temperature may be a temperature at which the controller shuts off the operating device.

A second aspect of the invention relates to a thermal variable-operation regulator provided with an operating device that heats up while operating. The thermal variable-operation regulator includes a temperature detector that detects the temperature of the operating device; a controller that sets the limitation temperature, based on which the operation of the operating device is limited, wherein the limitation temperature is set to the smoothed temperature obtained by performing the predetermined smoothing process on the detected temperature, when the smoothed temperature is equal to or lower than the predetermined temperature, and the limitation temperature is set to the predetermined temperature, when the smoothed temperature obtained by performing the predetermined smoothing process on the detected temperature is higher the predetermined temperature, and the predetermined smoothing process is a process where the smoothed temperature is obtained by adding a value, obtained by dividing a difference between the detected temperature and the already set limitation temperature by a predetermined number "n", to the already set limitation temperature to bring the smoothed temperature closer to the detected temperature, and that operates the operating device, and progressively limits the operation of the operating device as the limitation temperature increases.

With the thermal variable-operation regulator according to the second aspect, when the smoothed temperature, which is obtained by performing the predetermined smoothing process on the temperature of the operating device that heats up while operating, is equal to or lower than the predetermined temperature, the limitation temperature is set to the smoothed temperature. Also, the operation of the operating device is progressively limited as the limitation temperature increases. On the other hand, when the smoothed temperature, which is obtained by performing the predetermined smoothing process on the temperature of the operating device, is higher than the predetermined temperature, the limitation temperature is set to the predetermined temperature. Also, the operation of the operating device is progressively limited as the limitation temperature increases. Namely, the limitation temperature is limited by the predetermined temperature. When the temperature of the operating device decreases, the smoothed temperature promptly becomes equal to or lower than the predetermined temperature. It is, therefore, possible to promptly decrease the degree to which the operation of the operating device is limited based on the limitation temperature set to the smoothed temperature. In this case, examples of the operating device are an electric motor, an electric power generator, a drive circuit that drives the electric motor or the electric power generator, and a voltage converter that converts a voltage of electric power. Also, the predetermined temperature may be a temperature at which the controller shuts off the operating device.

In the first or second aspect, the predetermined smoothing process may be a process where the smoothed temperature is obtained by adding a value, which is obtained by dividing the difference between the detected temperature and the already set limitation temperature by a predetermined number "n", to the already set limitation temperature to bring the smoothed temperature closer to the detected temperature. The predetermined number "n" varies depending on the time intervals of setting of the limitation temperature. When the time interval is 50 to 100 milliseconds (msec), the predetermined number "n" may be approximately 2 to approximately 10.

A third aspect of the invention relates to a method for controlling an operating device that heats up while operating. The method includes (a) setting the limitation temperature, based on which the operation of the operating device is limited, wherein the limitation temperature is set to the smoothed temperature that is obtained by performing the predetermined smoothing process on the temperature of the operating device, when the amount of change in the temperature of the thermal variable-operation regulator is equal to or less than a predetermined change amounts and the limitation temperature is set to the smoothed temperature that is obtained by performing the predetermined smoothing process on the temperature of the operating device detected when the last smoothed temperature was obtained, when the amount of change in the temperature of the operating device is greater than the predetermined change amount, and the predetermined smoothing process is a process where the smoothed temperature is obtained by adding a value, obtained by dividing a difference between the detected temperature and the already set limitation temperature by a predetermined number "n", to the already set limitation temperature to bring the smoothed temperature closer to the detected temperature and (b) progressively limiting the operation of the operating device as the limitation temperature increases.

With the method for controlling the operating device according to the third aspect of the invention, when the amount of change in the temperature of the operating device that heats up while operating is equal to or less than the predetermined change amount, the limitation temperature is set to the smoothed temperature obtained by performing the predetermined smoothing process on the temperature of the operating device. Also, the operation of the operating device is progressively limited as the limitation temperature increases. On the other hand, when the amount of change in the temperature of the operating device is greater than the predetermined change amount, the limitation temperature is set to the smoothed temperature that is obtained by performing the predetermined smoothing process on the temperature of the operating device detected when the last smoothed temperature was obtained. Also, the operation of the operating device is progressively limited as the limitation temperature increases. Namely, when the amount of change in the temperature of the operating device is greater than the predetermined change amount, it is determined that there is an abnormality in the detection of the temperature, and the limitation temperature is set without using the abnormally detected temperature. It is, thus, possible to suppress unnecessary limitation of the operation of the operating device based on the abnormally detected temperature. Examples of the operating device are an electric motor, an electric power generator, a drive circuit that drives the electric motor or the electric power generator, and a voltage converter that converts a voltage of electric power.

A fourth aspect of the invention relates to a method for controlling an operating device that heats up while operating. The method includes (a) setting the limitation temperature, based on which the operation of the operating device is limited, wherein the limitation temperature is set to the smoothed temperature that is obtained by performing the predetermined smoothing process on the temperature of the operating device, when the smoothed temperature is equal to or lower than the predetermined temperature, and the limitation temperature is set to the predetermined temperature, when the smoothed temperature that is obtained by performing the predetermined smoothing process on the temperature of the operating device is higher than the predetermined temperature, and the predetermined smoothing process is a process where the smoothed temperature is obtained by adding a value, obtained by dividing a difference between the detected temperature and the already set limitation temperature by a predetermined number "n", to the already set limitation temperature to brine the smoothed temperature closer to the detected temperature, and (b) progressively limiting the operation of the operating device as the limitation temperature increases.

With the method for controlling the operating device according to the fourth aspect of the invention, when the smoothed temperature, which is obtained by performing the predetermined smoothing process on the temperature of the operating device that heats up while operating, is equal to or lower than the predetermined temperature, the limitation temperature is set to the smoothed temperature. Also, the operation of the operating device is progressively limited as the limitation temperature increases. On the other hand, when the smoothed temperature, which is obtained by performing the predetermined smoothing process on the temperature of the operating device, is higher than the predetermined temperature, the limitation temperature is set to the predetermined temperature. Also, the operation of the operating device is progressively limited as the limitation temperature increases. Namely, the limitation temperature is limited by the predetermined temperature. When the temperature of the operating device decreases, the smoothed temperature promptly becomes equal to or lower than the predetermined temperature. It is, therefore, possible to promptly decrease the degree to which the operation of the operating device is limited based on the limitation temperature set to the smoothed temperature. In this case, examples of the operating device are an electric motor, an electric power generator, a drive circuit that drives the electric motor or the electric power generator, and a voltage converter that converts a voltage of electric power. Also, the predetermined temperature may be a temperature at which the controller shuts off the operating device.

BRIEF DESCRIPTION OF THE DRAWINGS

The features, advantages, thereof, and technical and industrial significance of this invention will be better understood by reading the following detailed description of preferred embodiments of the invention, when considered in connection with the accompanying drawings, in which.

DETAILED DESCRIPTION OF THE EXAMPLE EMBODIMENTS

In the following description and the accompanying drawings, the present invention will be described in more detail in terms of an example embodiment.

Figure 1:
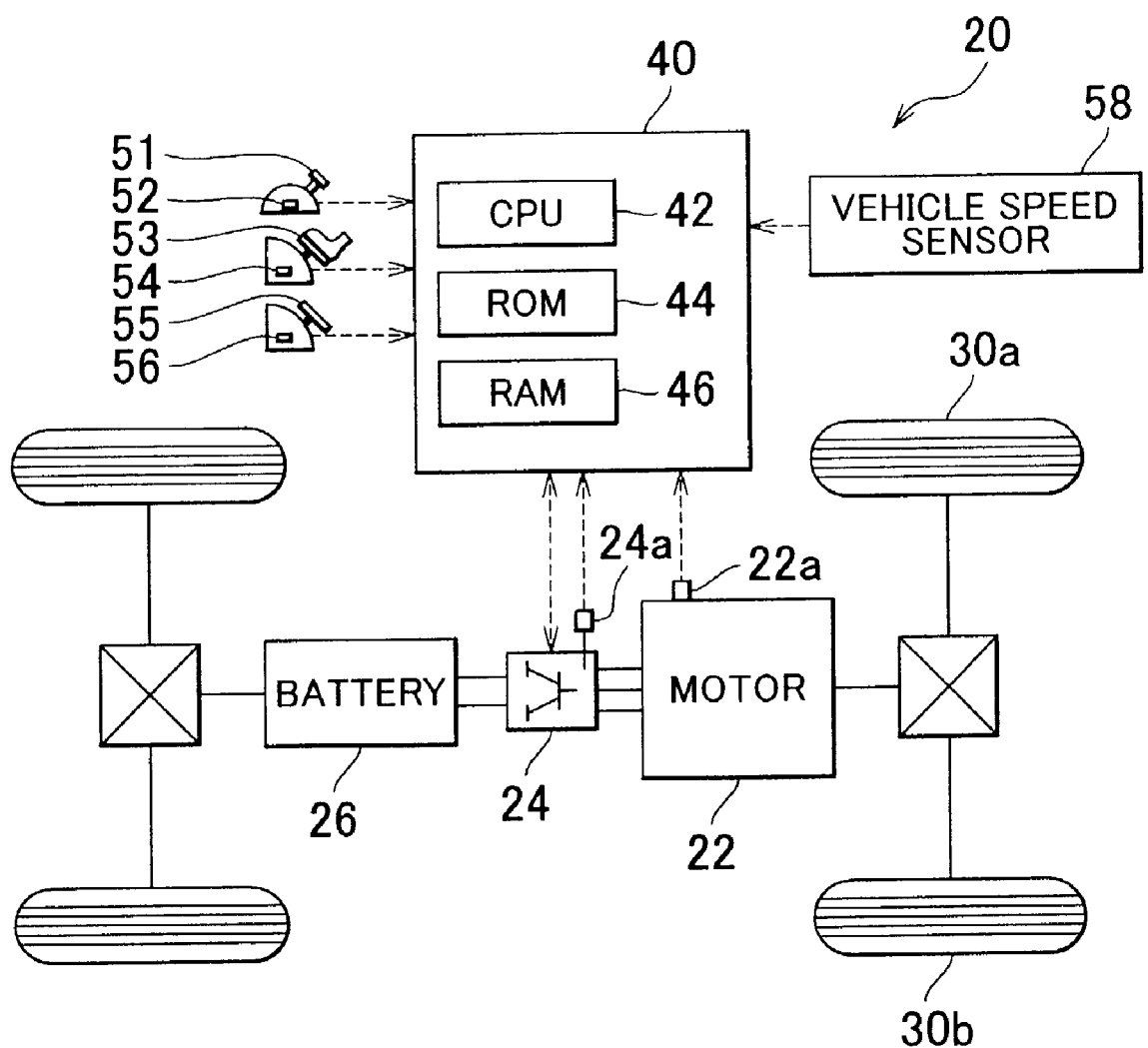
FIG. 1 illustrates the schematic view of an electric vehicle 20 provided with a thermal variable-operation regulator including an inverter 24 that serves as an operating device, according to an embodiment of the invention.

FIG. 1 illustrates the schematic view of an electric vehicle 20 including a thermal variable-operation regulator according to the embodiment of the invention. The thermal variable-operation regulator includes an inverter 24 that serves as an operating device. As shown in FIG. 1, the electric vehicle 20 in the embodiment includes a motor 22 that is used for driving the electric vehicle 20 and that is formed of a known synchronous generator motor which outputs power to drive wheels 30a and 30b; the inverter 24 that converts direct-current electric power supplied from a battery 26 into pseudo-three-phase alternating current electric power and supplies the pseudo-three-phase alternating current electric power to the motor 22; and an electronic control unit (hereinafter, simply referred to as an "ECU") 40 that performs control of the entire vehicle including control of the inverter 24.

The ECU 40 is formed of a microprocessor mainly including a CPU 42. In addition to the CPU 42, the ECU 40 includes ROM 44 that stores processing programs; RAM 46 that temporarily stores data; an input port (not shown); and an output port (not shown). The ECU 40 receives, through the input port, a turning angle α transmitted from a turning angle sensor 22a that detects the turning angle of the motor 22; an inverter temperature Tinv transmitted from a temperature sensor 24a that is connected to the inverter 24; a shift position SP transmitted from a shift position sensor 52 that detects the position of a shift lever 51; an accelerator pedal position Acc transmitted from an accelerator pedal position sensor 54 that detects the position of an accelerator pedal 53; a brake pedal position BP transmitted from a brake pedal position sensor 56 that detects the position of a brake pedal 55; a vehicle speed V transmitted from a vehicle speed sensor 58; and the like. The ECU 40 outputs, through the output port, a switching control signal to a switching element of the inverter 24 for controlling the operation of the motor 22, and the like.

The thermal variable-operation regulator includes the inverter 24 serving as the operating device. This thermal variable-operation regulator mainly includes the inverter 24, the temperature sensor 24a, and the ECU 40.

Figure 2:
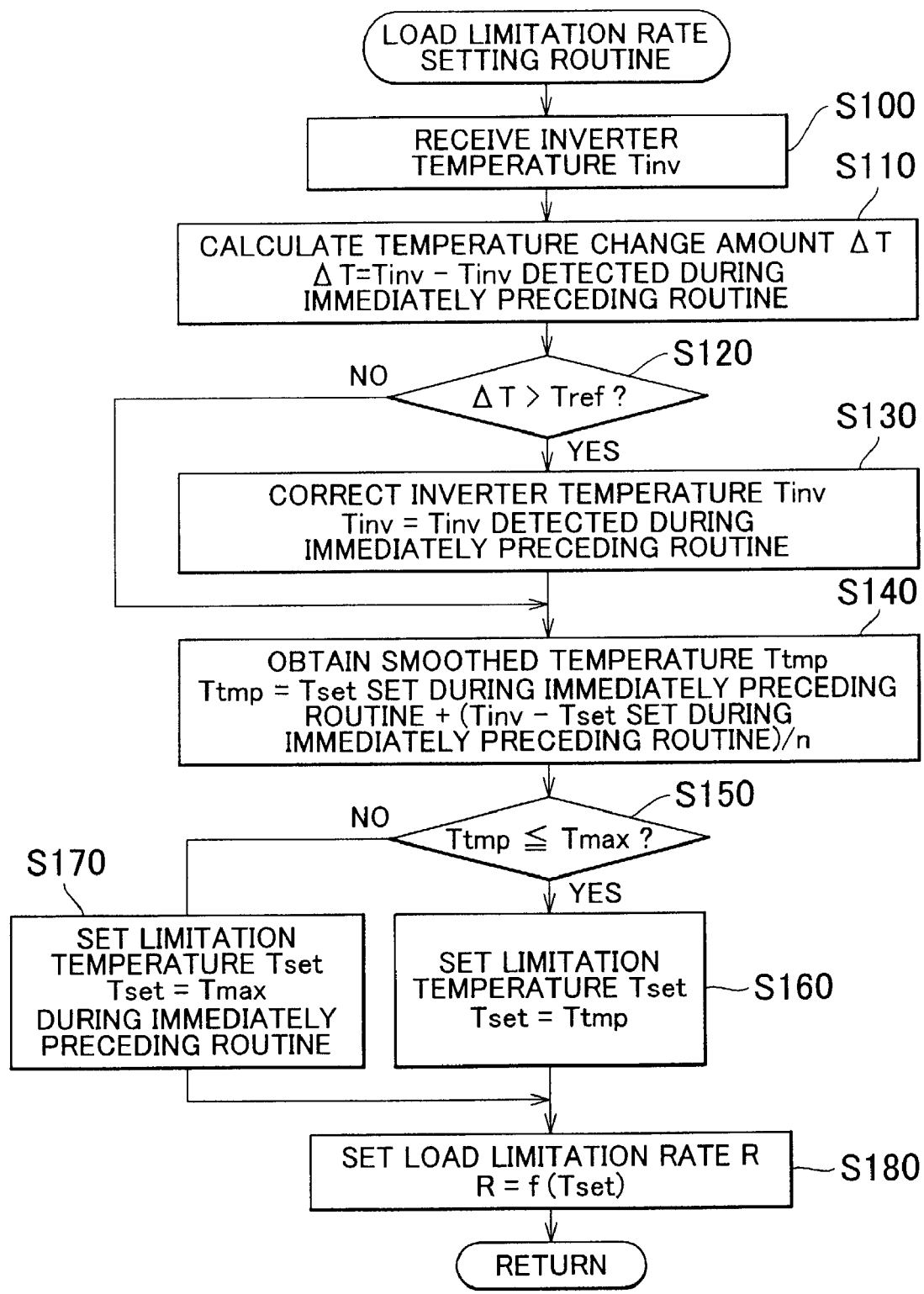
FIG. 2 illustrates the flowchart showing an example of the load limitation rate setting routine performed by an electronic control unit 40.

Next, the operation of the thermal variable-operation regulator configured according to the embodiment, especially, the operation when the load placed on the inverter 24 is limited based on the inverter temperature Tinv will be described. FIG. 2 illustrates the flowchart showing an example of the load limitation rate setting routine performed by the ECU 40. This routine is repeatedly performed at predetermined time intervals (for example, time intervals of several tens of milliseconds (msec)).

In the load limitation rate setting routine, the CPU 42 of the ECU 40 first receives the inverter temperature Tinv transmitted from the temperature sensor 24a (step S100), calculates a temperature change amount ΔT by obtaining the difference between the inverter temperature Tinv detected during the presently-performed routine and the inverter temperature Tinv detected during the immediately preceding routine (step S110), and then compares the temperature change amount ΔT with a threshold value Tref (step S120). The threshold value Tref is used to determine whether there is an abnormality in the detection performed by the temperature sensor 24a. The threshold value Tref may be set to a value that is higher than the upper limit of the permissible amount of change in the temperature of the inverter 24. When the temperature change amount ΔT is greater than the threshold value Tref, it is determined that there is an abnormality in the detection, and correction is made such that the inverter temperature Tinv detected during the immediately preceding routine is used in the presently-performed routine instead of using the inverter temperature Tinv detected during the presently-performed routine (step S130). As described so far, if there is an abnormality in the detection, the inverter temperature Tinv detected when there is no abnormality in the detection is used. This makes it possible to avoid the problems caused by using an abnormal temperature detected when there is an abnormality in the detection.

Figure 3:
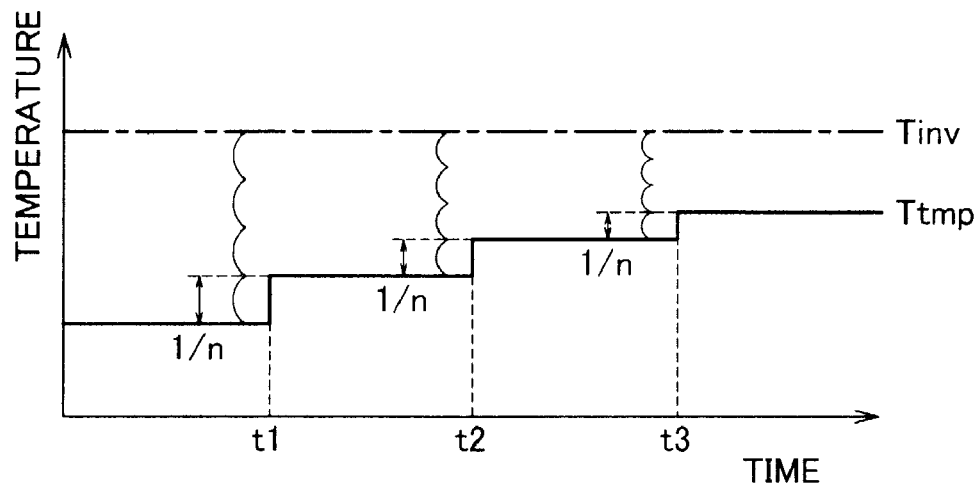
FIG. 3 illustrates the graph for describing how a smoothed temperature Ttmp is calculated by smoothing an inverter temperature Tinv.

After the temperature change amount ΔT is equal to or less than the threshold value Tref or the inverter temperature Tinv is corrected, a smoothed temperature Ttmp is calculated by smoothing the inverter temperature Tinv by using a limitation temperature Tset (based on which the operation of the inverter 24 is limited) set during the immediately preceding routine and the inverter temperature Tinv (step S140). In the embodiment, as shown by the following equation (1), the smoothed temperature Ttmp is calculated by adding the value, which is obtained by dividing the difference between the inverter temperature Tinv and the limitation temperature Tset set during the immediately preceding routine by a predetermined number "n", to the limitation temperature Tset set during the immediately preceding routine such that the smoothed temperature Ttmp comes closer to the inverter temperature Tinv. Preferably, the predetermined number "n" is a number of approximately 2 to approximately 10. In the embodiment, the predetermined number "n" is 4 or 5. FIG. 3 illustrates the graph for describing how the smoothed temperature Ttmp is calculated by smoothing the inverter temperature Tinv. In FIG. 3, each of time t1, time t2, and time t3 indicates the time at which the smoothed temperature Ttmp is calculated by performing the load limitation rate setting routine. FIG. 3 shows the case where the predetermined number "n" is 4 (n=4). As shown in FIG. 3, the smoothed temperature Ttmp comes closer to the inverter temperature Tinv in increments of 1/n of the difference between the smoothed temperature Ttmp and the inverter temperature Tinv. The limitation temperature Tset will be described later in detail.

$$Ttmp = Tset \text{ set during the immediately preceding routine} + (Tinv - Tset \text{ set during the immediately preceding routine})/n \quad (1)$$

Figure 4:
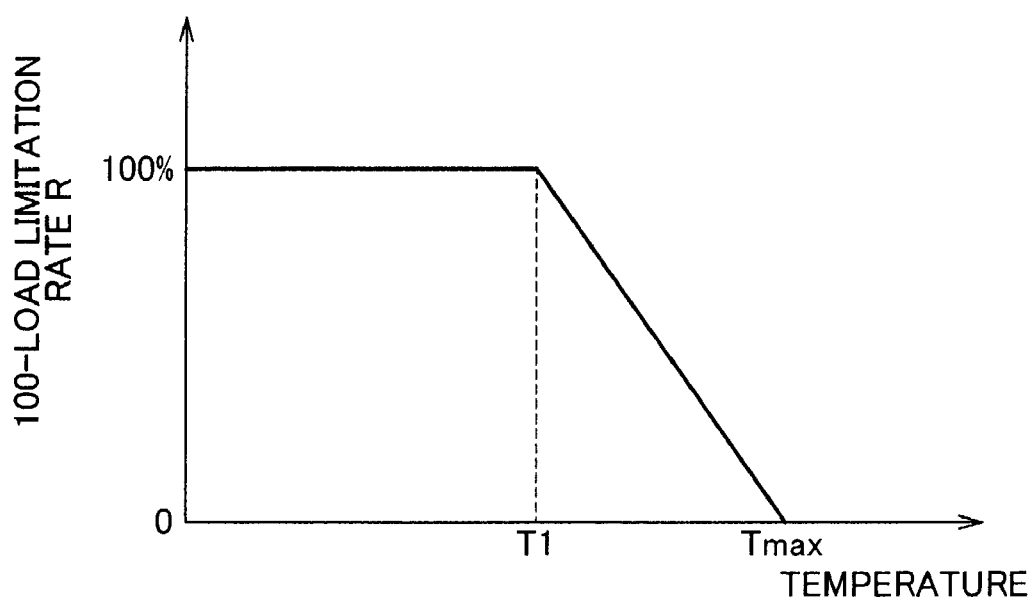
FIG. 4 illustrates the graph for describing an example of the relationship between a load limitation rate R and a limitation temperature Tset.

After the smoothed temperature Ttmp is thus calculated, the smoothed temperature Ttmp is compared with an upper limit temperature Tmax of the inverter 24 for control (step S150). If the smoothed temperature Ttmp is equal to or lower than the upper limit temperature Tmax, the limitation temperature Tset is set to the smoothed temperature Ttmp (step S160). On the other hand, if the smoothed temperature Ttmp is higher than the upper limit temperature Tmax, the limitation temperature Tset is set to the upper limit temperature Tmax (step S170). Then, a load limitation rate R for the inverter 24 is set based on the limitation temperature Tset (step S180), after which the routine ends. FIG. 4 illustrates an example of the relationship between the load limitation rate R and the limitation temperature Tset. In the example shown in FIG. 4, the load limitation rate is 0% until the limitation temperature Tset reaches a temperature T1. After the limitation temperature Tset reaches the temperature T1, the load limitation rate R linearly increases until the limitation temperature Tset reaches the upper limit temperature Tmax and the load limitation rate R becomes 100% when the upper limit temperature Tmax is reached. The load limitation rate R serves as the limitation rate for limiting the operation of the inverter 24. When the drive control of the electric vehicle 20 is performed, the load limitation rate R is used to limit the torque output from the motor 22. Namely, when the load limitation rate R is 50%, the operation of the inverter 24 is limited by 50%. As a result, the torque output from the motor 22 is reduced by 50%. When the load limitation rate R is 100%, the operation of the inverter 24 is limited by 100%, or shut off. As a result, output of the torque from the motor 22 is completely prohibited.

Figure 5:
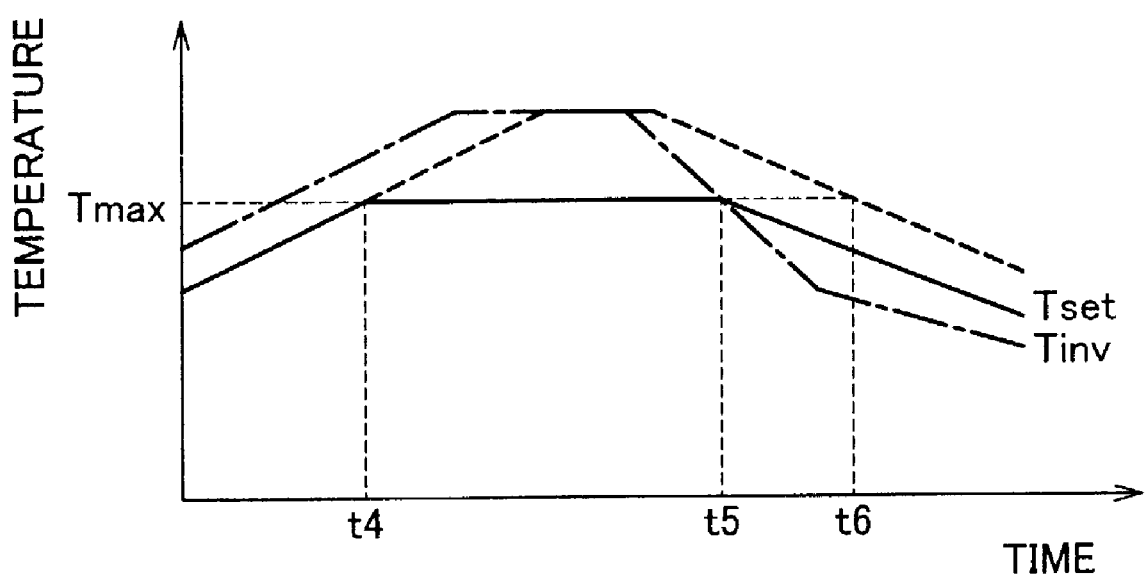
FIG. 5 illustrates the graph for describing how the inverter temperature Tinv, the limitation temperature Tset, and the comparative example change with time if the load limitation rate setting routine is repeatedly performed.

FIG. 5 illustrates the graph for describing how the inverter temperature Tinv, the limitation temperature Tset, and the comparative example change with time if the load limitation rate setting routine is repeatedly performed. In FIG. 5, the solid line indicates the limitation temperature Tset, the chain line indicates the inverter temperature Tinv, and the dashed line indicates the comparative example. Here, the comparative example indicates the limitation temperature Tset when the limitation temperature Tset is set to the smoothed temperature Ttmp even if the smoothed temperature Ttmp exceeds the upper limit temperature Tmax. As shown in FIG. 5, as the inverter temperature Tinv increases, the limitation temperature Tset and the comparative example both increase. At time t4 at which the smoothed temperature Ttmp exceeds the upper limit temperature Tmax, the limitation temperature Tset is fixed to the upper limit temperature Tmax. In contrast, the comparative example continues to increase without being fixed to the upper limit temperature Tmax, because the smoothed temperature Ttmp increases as the inverter temperature Tinv increases. After time t5 at which the inverter temperature Tinv decreases to the upper limit temperature Tmax, the limitation temperature Tset decreases as the inverter temperature Tinv decreases. At this time, the comparative example also decreases as the inverter temperature Tinv decreases. However, because the comparative example is higher than the upper limit temperature Tmax at time t5, the comparative example becomes lower than the upper limit temperature Tmax at time t6 subsequent to time t5. The load limitation rate R is 100% from time t4 to time t5 in the example shown in FIG. 5 according to the embodiment. In the comparative example, the load limitation rate R is 100% from time t4 to time t6. Therefore, according to the embodiment, although the operation of the inverter 24 is limited even after time t5, the inverter 24 can operate. As a result, torque can be output from the motor 22 although the torque output from the motor 22 is limited. In the comparative example, however, because the operation of the inverter 24 is shut off until time t6, torque cannot be output from the motor 22. When the inverter temperature Tinv becomes equal to or lower than the upper limit temperature Tmax, the inverter 24, the operation of which was shut off, can resume operating sooner in the embodiment, than in the comparative example.

With the thermal variable-operation regulator according to the embodiment, when the temperature change amount ΔT of the inverter temperature Tinv is greater than the threshold value Tref, it is determined that there is an abnormality in the detection, and the inverter temperature Tinv detected during the immediately preceding routine is used in the presently-performed routine instead of using the inverter temperature Tinv detected during the presently-performed routine.

Accordingly, it is possible to avoid the problems caused by using the abnormal temperature detected when there is an abnormality in the detection, namely, it is possible to avoid the problem that the operation of the motor 22 is unnecessarily limited by using the excessively high load limitation rate R that is obtained by setting the limitation temperature Tset to an excessively high value. As a result, the limitation temperature Tset can be set to a more appropriate value, and the load limitation rate R for the inverter 24 serving as the operating device can be set to a more appropriate value.

With the thermal variable-operation regulator according to the embodiment, when the smoothed temperature Ttmp obtained by smoothing the inverter temperature Tinv exceeds the upper limit temperature Tmax, the load limitation rate R is set based on the limitation temperature Tset that is set to the upper limit temperature Tmax. Therefore, the thermal variable-operation regulator according to the embodiment has the following advantages over the comparative example where the limitation temperature Tset is set to the smoothed temperature Ttmp even if the smoothed temperature Ttmp exceeds the upper limit temperature Tmax. According to the embodiment, when the inverter temperature Tinv becomes equal to or lower than the upper limit temperature Tmax, a decrease in the inverter temperature Tinv can be promptly reflected on the limitation temperature Tset, and, therefore, the inverter 24, which has been completely prohibited from operating, can restart operating promptly. As a result, output of the torque from the motor 22 can be promptly restarted.

With the thermal variable-operation regulator according to the embodiment, when the temperature change amount ΔT is greater than the threshold value Tref, the load limitation rate R is set by using the inverter temperature Tinv detected during the immediately preceding routine instead of using the inverter temperature Tinv detected during the presently-performed routine. Also, when the smoothed temperature Ttmp obtained by smoothing the inverter temperature Tinv exceeds the upper limit temperature Tmax, the load limitation rate R is set based on the limitation temperature Tset that is set to the upper limit temperature Tmax. However, the following modifications (1) and (2) may be made to the embodiment. In the modification (1), when the temperature change amount ΔT is greater than the threshold value Tref, the load limitation rate R is set by using the inverter temperature Tinv detected during the immediately preceding routine instead of using the inverter temperature Tinv detected in the presently-performed routine, as in the embodiment. However, even when the smoothed temperature Ttmp obtained by smoothing the inverter temperature Tinv exceeds the upper limit temperature Tmax, the load limitation rate R is set based on the limitation temperature Tset that is set to the smoothed temperature Ttmp. In the modification (2), even when the temperature change amount ΔT is greater than the threshold value Tref, the smoothed temperature Ttmp is obtained by smoothing the inverter temperature Tinv detected during the presently-performed routine. Also, when the smoothed temperature Ttmp exceeds the upper limit temperature Tmax, the load limitation rate R is set based on the limitation temperature Tset that is set to the upper limit temperature Tmax.

With the thermal variable-operation regulator according to the embodiment, the inverter 24 is operated based on the load limitation rate R for limiting the operation of the inverter 24, which is set based on the temperature Tinv of the inverter 24. However, the technology where, when the temperature change amount ΔT is greater than the threshold value Tref, the load limitation rate R is set by using the temperature detected during the immediately preceding routine instead of using the temperature detected during the presently-performed routine, or the technology where, when the smoothed temperature Ttmp obtained by smoothing the detected temperature exceeds the upper limit temperature Tmax, the load limitation rate R is set based on the limitation temperature Tset that is set to the upper limit temperature Tmax, may be applied to any types of operating devices that heats up while operating. These technologies can be applied to regulate the operation of various operating devices. For example, these technologies may be applied 1) when the operation of the motor 22 is regulated based on the temperature of the motor 22, 2) when the operation of the electric power generator is limited based on the temperature of the electric power generator, 3) when the operation of the drive circuit is limited based on the temperature of the switching element of the drive circuit such as the inverter for driving the electric power generator, 4) when the operation of the voltage converter is limited based on the temperature of the switching element used for the voltage converter such as a DC/DC converter, or 5) when the operation of the voltage converter is limited based on the temperature of a reactor of the voltage converter.

In the embodiment, the thermal variable-operation regulator including the inverter 24 serving as the operating device is mounted in the electric vehicle 20. However, the thermal variable-operation regulator may also be mounted in a hybrid vehicle or a commonly used gasoline-engine vehicle. Furthermore, the thermal variable-operation regulator may be mounted in other movable bodies such as a train, a vessel, or an aircraft. Also, the thermal variable-operation regulator may be embedded in an immovable equipment such as a construction machinery. Also, the thermal variable-operation regulator may be embedded in various types of electrical equipment such as air-conditioning equipment.

In the embodiment, the technology where the load limitation rate R is set by using the temperature detected during the immediately preceding routine instead of using the temperature detected during the presently-performed routine when the temperature change amount ΔT is greater than the threshold value Tref, and the technology where the load limitation rate R is set based on the limitation temperature Tset that is set to the upper limit temperature Tmax when the smoothed temperature Ttmp obtained by smoothing the detected temperature exceeds the upper limit temperature Tmax are realized in the thermal variable-operation regulator including the inverter 24 serving as the operating device. However, these technologies may be realized in a method for controlling the operating device that heats up while operating, such as the inverter 24.

The embodiment of the invention that has been described in the specification is to be considered in all respects as illustrative and not restrictive. The technical scope of the invention is defined by claims, and all modifications which come within the meaning and range of equivalency of the claims are therefore intended to be embraced therein.

The invention can be applied to the industry for producing the thermal variable-operation regulators including the operating devices such as an inverter, a motor, an electric power generator, and a DC/DC converter.

The invention claimed is:

1. A thermal variable-operation regulator including an operating device that heats up while operating, comprising:
   a temperature detector that detects a temperature (Tinv) of the operating device;
   a controller that sets a limitation temperature, based on which an operation of the operating device is limited, wherein the limitation temperature is set to a smoothed temperature, which is obtained by performing a predetermined smoothing process on the detected temperature, when a change amount of the detected temperature is equal to or less than a predetermined change amount, and the limitation temperature is set without using the detected temperature, when the change amount of the detected temperature is greater than the predetermined change amount; and that operates the operating device, and progressively limiting the operation of the operating device as the limitation temperature increases.

2. The thermal variable-operation regulator according to claim 1, wherein the controller sets the limitation temperature to the smoothed temperature that is obtained by performing the predetermined smoothing process on the temperature detected when the last smoothed temperature was obtained, when the change amount of the detected temperature is greater than the predetermined change amount.

3. The thermal variable-operation regulator according to claim 1, wherein controller means sets the limitation temperature to the smoothed temperature that is obtained by performing the predetermined smoothing process on the detected temperature, when the smoothed temperature is equal to or lower than a predetermined temperature; and sets the limitation temperature to the predetermined temperature, when the smoothed temperature that is obtained by performing the smoothing process on the detected temperature is higher than the predetermined temperature.

4. The thermal variable-operation regulator according to claim 3, wherein the predetermined temperature is a temperature at which the controller shuts off the operating device.

5. The thermal variable-operation regulator claim 1, wherein the operating device is one of an electric motor, an electric power generator, a driver circuit that drives the electric motor or the electric power generator, and a voltage converter that converts a voltage of electric power.

6. A thermal variable-operation regulator including an operating device that heats up while operating, compromising:

a temperature detector that detects a temperature of the operating device;

a controller that sets a limitation temperature, based on which an operation of the operating device is limited, wherein the limitation temperature is set to a smoothed temperature, which is obtained by performing predetermined smoothing process on the detected temperature, when the smoothed temperature is equal to or lower than a predetermined temperature, and the limitation temperature is set to the predetermined temperature, when the smoothed temperature obtained by performing the predetermined smoothing process on the detected temperature is higher the predetermined temperature, the smoothed temperature is obtained by adding a value, obtained by dividing a difference between the detected temperature and the already set limitation temperature by a predetermined number "n", to the already set limitation temperature to bring the smoothed temperature closer to the detected temperature, and that operates the operating device, and progressively limits the operation of the operating device as the limitation temperature increases.

7. The thermal variable-operation regulator according to claim 6, where the predetermined temperature is a temperature at which the operating means shuts off the operating device.

8. The thermal variable-operation regulator according to any claim 6, wherein the operating device is one of an electric motor, an electric power generator, a drive circuit that drives the electric motor or the electric power generator, and a voltage converter that converts a voltage of electric power.

9. A method for controlling an operating device that heats up while operating, comprising:

(a) setting a limitation temperature, based on which an operation of the operating device is limited, wherein the limitation temperature is set to a smoothed temperature, which is obtained by performing a predetermined smoothing process on a temperature of the operating device, when a change amount of the temperature of the thermal variable-operation regulator is equal or less than a predetermined change amount, and the limitation temperature is set to the smoothed temperature, which is obtained by performing the predetermined smoothing process on the temperature of the operating device detected when the last smoothed temperature was obtained, when the change amount of the temperature of the operating device is greater than the predetermined change amount; and the predetermined smoothing process is a process where the smoothed temperature is obtained by adding a value, obtained by dividing a difference between the detected temperature and the already set limitation temperature by a predetermined number "n", to the already set limitation temperature to bring the smoothed temperature closer to the detected temperature; and (b) progressively limiting the operation of the operating device as the limitation temperature increases.

10. A method for controlling an operating device that heats up while operating, comprising:

(a) setting a limitation temperature, based on which an operation of the operating device is limited, wherein the limitation temperature is set to a smoothed temperature, which is obtained by performing a predetermined smoothing process on a temperature of the operating device, when the smoothed temperature is equal to or lower than a predetermined temperature, and the limitation temperature is set to the predetermined temperature, when the smoothed temperature that is obtained by performing the predetermined smoothing process on the temperature of the operating device is higher than the predetermined temperature, and the predetermined smoothing process is a process where the smoothed temperature is obtained by adding a value, obtained by dividing a difference between the detected temperature and the already set limitation temperature by a predetermined number "n", to the already set limitation temperature to bring the smoothed temperature closer to the detected temperature; and (b) progressively limiting the operation of the operating device as the limitation temperature increases.

* * * * *